Nov. 25, 1930.  G. MORGAN  1,782,543

POWER TRANSMITTING MECHANISM

Filed Oct. 19, 1925

Inventor
GUY MORGAN

By Jking Harness

Attorney

Patented Nov. 25, 1930

1,782,543

UNITED STATES PATENT OFFICE

GUY MORGAN, OF NEW YORK, N. Y., ASSIGNOR TO THE WARFORD CORPORATION, OF NEW YORK, N. Y., A CORPORATION OF NEW YORK

POWER-TRANSMITTING MECHANISM

Application filed October 19, 1925. Serial No. 63,531.

It is the primary object of my invention to provide a construction whereby a speed reduction or over drive can be secured from a rotating shaft and more particularly my invention is intended for use as an auxiliary speed change device for automobiles.

Another object of my invention is to provide such a device of small and compact form, having a characteristic of quietness, and one of cheap and economical construction.

With the above and other objects in view my invention consists in the arrangement, combination and construction of the various parts of my improved device as described in the specification, claimed in my claims and shown in the accompanying drawings in which:

Figure 1:
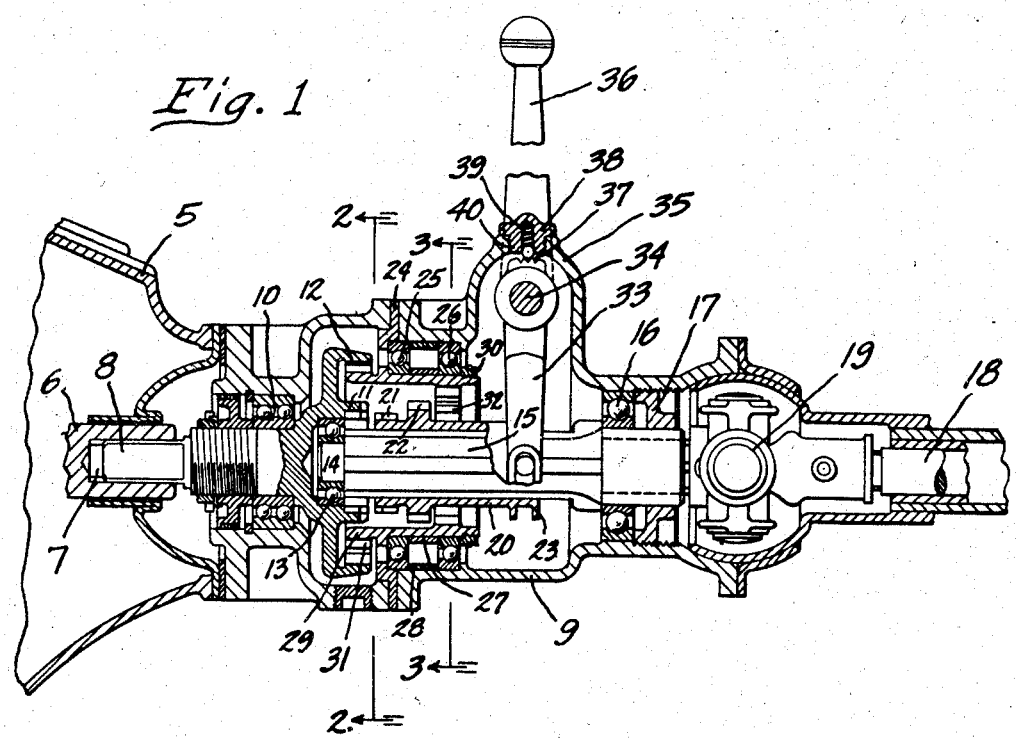
Fig. 1 is a longitudinal sectional view, illustrating my invention.

I have shown the rear end of a main transmission casing 5 from which a shaft 6 extends. The shaft 6 has an angular opening 7 in its rearward end within which the angular end 8 of another shaft, aligned therewith, is positioned so that the two shafts may rotate in unison.

Positioned rearwardly of the main transmission housing 5 is an auxiliary housing or casing which may be indicated generally as 9. A ball bearing 10 is mounted in the forward end of the casing 9 and supports the rearward end of the shaft 8. On the extreme rearward end of the shaft 8 are an internal gear member 12 and a clutch member 11. Mounted within a recess forwardly of the teeth of the gear 11 is another ball bearing 13 in which the end 14 of a splined shaft is mounted. The other end of the shaft 15 is mounted in a ball bearing 16, adjustably held in place by the member 17 which has screw threaded engagement with the rearward end of the case 9. The shaft 15 is connected with a propeller shaft 18 by means of a universal joint 19.

Slidably mounted on the splined portion of the shaft 15 is a sleeve 20 which has the clutch member 21 and gear 22 thereon as well as a shifting collar 23.

An adapter plate 24 is mounted in the case 9 and a ball bearing 25 abuts against one side thereof. A second ball bearing 26 is held in spaced relation to the bearing 25 by means of a pair of spaced sleeves 27 and 28. Mounted within the bearings 25 and 26 is a tubular shell 29 which is held in eccentric relation to the shaft 15 and to the gears 12 and 22 and gear shaped clutch members 11 and 21. The rearward end of the shell 29 is screw threaded and a ring 30 is screwed thereon for holding the bearing 26 in place against rearward displacement. The shell 29 is provided with an external gear 31 and an internal gear 32.

A shifter fork 33 is mounted on a shaft 34 within the boss 35 of the case 9 and is adapted to be actuated by a conventional gear shift lever 36. The top of the shifter fork is provided with three notches 37 and a cap 38 is screwed onto the boss 35 directly above the notches 37. A coil spring 39 is mounted in an aperture provided within the cap 38 and a ball 40 is adapted to be held in pressed relationship by the spring 39 in any one of the notches 37.

Figure 2:
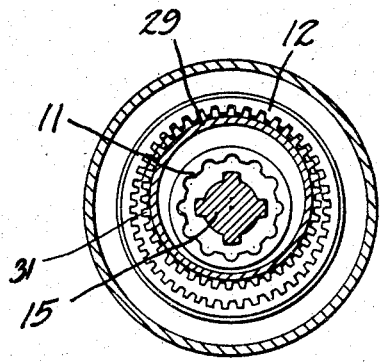
Fig. 2 is a sectional view taken on line 2—2 of Fig. 1.
Figure 3:
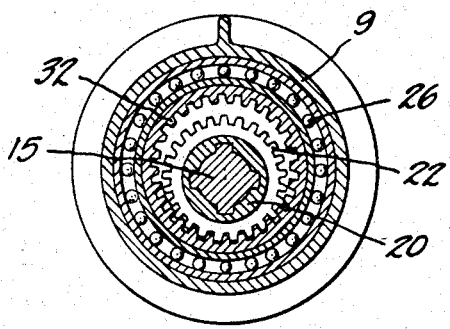
Fig. 3 is a sectional view taken on line 3—3 of Fig. 1.

In the practical operation of my improved device, rotation of the main shaft 6 from the main transmission will in turn cause rotation of the shaft 8 and its clutch member 11 and gear 12. The gear 31 constantly meshes with the gear 12, it being noted, particularly in Fig. 2, that although the gear 31 is mounted eccentrically of the gear 12, there are but a minimum number of teeth on the two gears which do not mesh. Those teeth having full engagement are shown as being on the top portions thereof, while those not meshing are shown to be on the bottom portion thereof.

In order to transmit power from the shaft 8 to the propeller shaft 18 so that the speed shall be the same as that of shaft 8, the shifter lever 36 is moved to shift the member 20 forwardly and engage the external teeth of the clutch member 21 with the internal teeth of the clutch member 11, so as to effect a direct drive. In order to effect an over drive the member 20 is shifted rearwardly to disengage the clutch members 11 and 21 and engage the gear 22 with the gear 32. This engagement causes rotation of the shaft 15 at a higher rate of speed than that of the shaft 6 with the result that the shaft 18 will be rotated at a higher speed.

It will be apparent from the foregoing that I have constructed an extremely simple, light and compact device which is well adapted for the purpose intended, and that, in both speeds of my device, the driving connection of the gears are internal, so as to reduce gear noises to a minimum.

It will be obvious that various changes may be made in the arrangement, combination and construction of the various parts of my device without departing from the spirit of my invention and it is my intention to cover by my claims such change as may be reasonably included within the scope thereof.

What I claim is:

1. In combination, a casing, a shaft extended into said casing and having an enlarged end embodying a clutch member and an internal gear, a second shaft aligned with the first and having a clutch member and a gear thereon, said clutch member adapted to mesh with first said clutch member, a plate secured in said casing, a bearing abutting said plate on one side, a spacer element abutting said bearing on its other side, a second bearing abutting the other side of said spacer, a shell mounted in said bearings eccentrically of said shafts, an external gear on said shell meshing with the said internal gear and an internal gear on the shell adapted to mesh with the gear on the second shaft.

2. In combination, a casing having aligned end openings, shafts extended through said openings into the said casing, clutch members on the shafts for joining them, a portion of the casing between the ends thereof being eccentric of the said shafts, a plate secured at said eccentric portion, gears on said shafts and a member supported and positioned by said eccentric portion and said plate and having external and internal gearing adapted to operably connect the gears on said shafts.

3. In combination, a gear casing comprising two shells each shell having two openings eccentric of each other, one of said shells carrying a rotatable member and a bearing therefor, a concentric adapter member engaging one of the openings in each case and bringing the outer openings in axial alignment, said adapter member also serving to position said bearing.

4. In combination a gear casing comprising two shells, each shell having two openings eccentric of each other, a concentric adapter member engaging one of the openings in each case and bringing the other openings in axial alignment, shafts extending into said casing, clutch members on the shafts for joining them, gearing carried by the shafts, a member carried by the eccentric portion of said casing having external and internal gearing mounted thereon, and means for disconnecting said clutch members and connecting the gearing on the shafts through the gearing carried by the eccentric portion.

GUY MORGAN.